United States Patent Office.

THEODORE GENNERT, OF NEW YORK, N. Y.

*Letters Patent No. 82,106, dated September 15, 1868.*

IMPROVEMENT IN THE MANUFACTURE OF BEET-SUGAR.

*The Schedule referred to in these Letters Patent and making part of the same.*

TO ALL WHOM IT MAY CONCERN:

Be it known that I, THEODORE GENNERT, of the city, county, and State of New York, have invented a new and useful Improvement in the Manufacture of Beet-Sugar; and I do hereby declare the following to be a full, clear, and exact description thereof, enabling those skilled in the art to make and use the same.

This invention consists in treating beet-sugar, after the same has been drained of its sirup or molasses, with cane-sirup or cane-molasses, under the action of more or less heat, in such a manner that the objectionable odor inherent to beet-sugar, after the same has been drained, is effectually removed, and the market value of the beet-sugar is materially increased. The effect of the cane-sirup or cane-molasses on the beet-sugar is improved by the additional action of steam, and the cane-sirup or molasses is used over and over again; until it is saturated with the odor, when it is filtered through bone-black, and thereby fit for repeated use.

Beet-sugar, as now manufactured, has an objectionable odor after it has been drained of its molasses or sirup, and this odor materially deteriorates its market value. In order to remove this odor, I treat the beet-sugar with cane-sirup or molasses, which I apply in a more or less concentrated state, according to the nature of the beet-sugar to be deodorized.

By the action of the cane-sirup or molasses, the crust of the crystals of the beet-sugar is dissolved, and the odor inherent to said crust is taken up by the cane-sirup or molasses.

The cane-sirup or molasses is brought in contact with the beet-sugar, in a suitable mixer or mash-machine, and the mass is continually stirred, so that every particle or crystal of the beet-sugar is brought in contact with the cane-sirup or molasses. The effect of the cane-sirup or molasses on the beet-sugar is increased by heating the mixture to a temperature of from $150°$ to $180°$.

After the beet-sugar has been exposed to the action of the cane-sirup or molasses for a sufficient length of time, it is run into an ordinary centrifugal machine, and separated from the sirup, and then it is exposed to the action of water or steam, to complete the process.

The cane-sirup or molasses, which is separated from the beet-sugar by the action of the centrifugal machine, contains a certain percentage of dissolved beet-sugar and beet-molasses, and I use it over and over again, until it is saturated with the odor of the beet-sugar or beet-molasses, which it dissolves.

The cane-sirup or cane-molasses, after having been saturated with the odor of the beet-sugar, is run through bone-black filters, whereby the same is rendered fresh and fit for repeated use.

Having thus described my invention, what I claim as new, and desire to secure by Letters Patent, is—

1. Treating beet-sugar with cane-sirup or cane-molasses, substantially as and for the purpose described.

2. Treating beet-sugar with cane-sirup or cane-molasses, under the application of heat, substantially as and for the purpose set forth.

3. Exposing the beet-sugar to the action of water or steam, after the same has been treated with cane-sirup or molasses, substantially as and for the purpose described.

THEODORE GENNERT.

Witnesses:
   W. HAUFF,
   J. C. POLLER.